US012750914B2

(12) United States Patent
Deng

(10) Patent No.: US 12,750,914 B2
(45) Date of Patent: Sep. 29, 2026

(54) COMMUNICATION METHOD OF COMMUNICATION TERMINAL AND ELECTRONIC DEVICE FOR COMMUNICATING SERVICE DATA OF AN APPLICATION

(71) Applicant: SAMSUNG ELECTRONICS CO., LTD., Suwon-si (KR)

(72) Inventor: Jie Deng, Suzhou Industrial Park (CN)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 688 days.

(21) Appl. No.: 17/986,491

(22) Filed: Nov. 14, 2022

(65) Prior Publication Data

US 2023/0422340 A1 Dec. 28, 2023

(30) Foreign Application Priority Data

Jun. 23, 2022 (CN) ......................... 202210719939.8

(51) Int. Cl.
*H04W 76/28* (2018.01)
*H04W 76/10* (2018.01)

(52) U.S. Cl.
CPC ........... *H04W 76/28* (2018.02); *H04W 76/10* (2018.02)

(58) Field of Classification Search
CPC .............................. H04W 76/28; H04W 76/10
(Continued)

(56) References Cited

U.S. PATENT DOCUMENTS

| | | | |
|---|---|---|---|
| 9,131,441 | B2 | 9/2015 | Singhal et al. |
| 11,197,346 | B2 | 12/2021 | Lovlekar et al. |

(Continued)

FOREIGN PATENT DOCUMENTS

| | | | |
|---|---|---|---|
| CN | 110691423 | A | 1/2020 |
| CN | 112218354 | A | 1/2021 |

(Continued)

OTHER PUBLICATIONS

3rd Generation Partnership Project; Technical Specification Group Core Network and Terminals; Non-Access-Stratum (NAS) functions related to Mobile Station (MS) in idle mode (Release 14), 3GPP TS 23.122 V14.5.0 (Jun. 018), Total 54 pages.

(Continued)

*Primary Examiner* — Christopher B Robinson
*Assistant Examiner* — Chong G Kim
(74) *Attorney, Agent, or Firm* — Sughrue Mion, PLLC

(57) ABSTRACT

A communication method of a communication terminal and an electronic device are disclosed. The communication method comprises: in response to the communication terminal entering a predetermined mode, detecting a state of Radio Resource Control (RRC) of the communication terminal; in response to the communication terminal being in a RRC idle state, making the communication terminal enter and keep in a RRC connection state, and prohibiting the communication terminal from entering a discontinuous reception DRX state; in response to the communication terminal being in the RRC connection state, keeping the communication terminal in the RRC connection state; and receiving and/or sending service data of an application installed on the communication terminal in the RRC connection state.

19 Claims, 5 Drawing Sheets

(58) Field of Classification Search
USPC .......................................................... 370/329
See application file for complete search history.

(56) References Cited

U.S. PATENT DOCUMENTS

| | | | | |
|---|---|---|---|---|
| 2011/0130150 | A1 | 6/2011 | Kolding et al. | |
| 2013/0286989 | A1* | 10/2013 | Zhu | H04W 48/12 370/329 |
| 2016/0057044 | A1* | 2/2016 | Koc | H04W 24/02 370/311 |
| 2018/0054799 | A1* | 2/2018 | Starsinic | H04W 52/0225 |
| 2019/0069226 | A1 | 2/2019 | Lee et al. | |
| 2019/0215278 | A1 | 7/2019 | Wu et al. | |
| 2020/0128484 | A1 | 4/2020 | Su et al. | |
| 2020/0344838 | A1* | 10/2020 | Wu | H04W 76/28 |
| 2022/0191721 | A1* | 6/2022 | Yi | H04W 28/0278 |
| 2022/0346180 | A1* | 10/2022 | Tseng | H04W 76/14 |
| 2023/0043616 | A1* | 2/2023 | Ren | H04W 52/0216 |

FOREIGN PATENT DOCUMENTS

| | | | |
|---|---|---|---|
| CN | 113490284 | A * | 10/2021 |
| WO | 2016078443 | A1 | 5/2016 |
| WO | 2022/084053 | A1 | 4/2022 |

OTHER PUBLICATIONS

3rd Generation Partnership Project; Technical Specification Group Radio Access Network; NR; Radio Resource Control (RRC) protocol specification (Release 16), 3GPP TS 38.331 V16.3.1 (Jan. 2021), Total 677 pages.
Communication issued Aug. 30, 2024 by the Intellectual Property Office of China in Chinese Patent Application No. 202210719939.8.
"Discussion on the impacts of TA expiry and SR Failure for uplink positioning", Document: R2-2100171, Agenda item: 6.3.4, Source: Huawei, HiSilicon, 3GPP TSG-RAN WG2 Meeting #116-e, Electronic, Nov. 1-12, 2021, 8 pages.
Communication issued Feb. 27, 2025 by the China National Intellectual Property Administration in Chinese Patent Application No. 202210719939.8.

* cited by examiner

COMMUNICATION METHOD OF COMMUNICATION TERMINAL AND ELECTRONIC DEVICE FOR COMMUNICATING SERVICE DATA OF AN APPLICATION

CROSS-REFERENCE TO RELATED APPLICATION(S)

This application claims priority from Chinese Patent Application No. 202210719939.8, filed on Jun. 23, 2022, in the China National Intellectual Property Administration, the entire disclosure of which is incorporated herein by reference for all purposes.

BACKGROUND

1. Field

The disclosure relates to a field of communication, and more particularly, to a communication method of a communication terminal and an electronic device.

2. Description of Related Art

In general, service data of an application installed on a communication terminal is from an application processor. In this case, since the application processor needs to process many programs in the foreground and the background at the same time, the application processor will cause some delay. Moreover, when the service data of the application processor is from a communication processor, the communication processor communicates with a base station through a radio frequency air interface in accordance with a 3GPP protocol, and as such, the communication processor also causes delay to the reception and transmission of the service data.

Therefore, a technology for reducing the delay in receiving and/or sending the service data of the application installed on the communication terminal is required.

SUMMARY

According to an aspect of the disclosure, there is provided a communication method of a communication terminal, including: in response to the communication terminal entering a first mode, detecting a state of Radio Resource Control (RRC) of the communication terminal, in response to the communication terminal being in a RRC idle state, controlling the communication terminal to enter and maintain an RRC connection state, and prohibiting the communication terminal from entering a discontinuous reception (DRX) state, in response to the communication terminal being in the RRC connection state, controlling the communication terminal to maintain the RRC connection state and receiving or sending service data of an application installed on the communication terminal in the RRC connection state.

According to another aspect of the disclosure, there is provided a non-transitory computer-readable storage medium storing instructions that, when executed by a processor, cause the processor to execute the communication method including: in response to the communication terminal entering a first mode, detecting a state of Radio Resource Control (RRC) of the communication terminal, in response to the communication terminal being in a RRC idle state, controlling the communication terminal to enter and maintain an RRC connection state, and prohibiting the communication terminal from entering a discontinuous reception (DRX) state, in response to the communication terminal being in the RRC connection state, controlling the communication terminal to maintain the RRC connection state and receiving or sending service data of an application installed on the communication terminal in the RRC connection state.

According to another aspect of the disclosure, there is provided a communication terminal including: a memory storing one or more instructions; and a processor configured to execute the one or more instruction to: detect a state of Radio Resource Control (RRC) of the communication terminal, based on the communication terminal entering a first mode, based on the communication terminal being in an RRC idle state, control the communication terminal to enter and maintain an RRC connection state, and prohibit the communication terminal from entering a discontinuous reception (DRX) state, based on the communication terminal being in the RRC connection state, control the communication terminal to maintain the RRC connection state and receive or send service data of an application installed on the communication terminal in the RRC connection state.

Other aspects and/or advantages of the disclosure will be partially described in the following description, and part will be clear through the description or may be learn through the practice of the disclosure.

BRIEF DESCRIPTION OF THE DRAWINGS

The above and other objects, features and advantages of the disclosure will become clearer through the following detailed description together with the accompanying drawings in which.

DETAILED DESCRIPTION OF EXEMPLARY EMBODIMENTS

Figure 1:
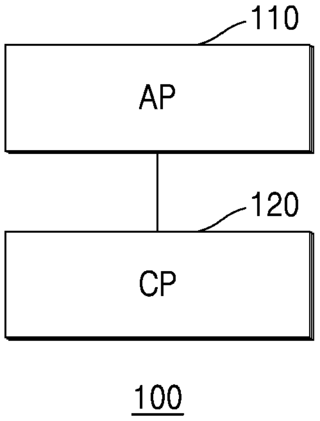
FIG. 1 is a block diagram showing an electronic device according to an example embodiment of the disclosure.

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

The following structural or functional descriptions of examples disclosed in the disclosure are merely intended for the purpose of describing the examples and the examples may be implemented in various forms. The examples are not meant to be limited, but it is intended that various modifications, equivalents, and alternatives are also covered within the scope of the claims.

Although terms of "first" or "second" are used to explain various components, the components are not limited to the terms. These terms should be used only to distinguish one component from another component. For example, a "first" component may be referred to as a "second" component, or similarly, and the "second" component may be referred to as the "first" component within the scope of the right according to the concept of the disclosure.

It will be understood that when a component is referred to as being "connected to" another component, the component can be directly connected or coupled to the other component or intervening components may be present.

As used herein, the singular forms "a", "an", and "the" are intended to include the plural forms as well, unless the context clearly indicates otherwise. It should be further understood that the terms "comprises" and/or "comprising," when used in this specification, specify the presence of stated features, integers, operations, operations, elements, components or a combination thereof, but do not preclude the presence or addition of one or more other features, integers, operations, operations, elements, components, and/or groups thereof.

Unless otherwise defined, all terms including technical or scientific terms used herein have the same meaning as commonly understood by one of ordinary skill in the art to which examples belong. It will be further understood that terms, such as those defined in commonly-used dictionaries, should be interpreted as having a meaning that is consistent with their meaning in the context of the relevant art and will not be interpreted in an idealized or overly formal sense unless expressly so defined herein.

Hereinafter, examples will be described in detail with reference to the accompanying drawings. Regarding the reference numerals assigned to the elements in the drawings, it should be noted that the same elements will be designated by the same reference numerals, and redundant descriptions thereof will be omitted.

FIG. 1 is a block diagram showing an electronic device according to an example embodiment of the disclosure.

The electronic device according to various example embodiments of the disclosure may include, for example, mobile phone, tablet personal computer (PC), personal digital assistant (PDA), etc. However, the disclosure is not limited to thereto, and the electronic device according to the disclosure may be any electronic device having a mobile communication function.

As shown in FIG. 1, the electronic device 100 according to an example embodiment of the disclosure may include an application processor (AP) 110 and a communication processor (CP) 120.

In some example embodiments, a user interface of the electronic device 100 may be provided with an option making the electronic device 100 enter an acceleration mode. According to an example embodiment, the user interface may include a button for making the electronic device 100 enter the acceleration mode. Here, the acceleration mode may be a mode that reduces delay in receiving and sending service data of an application installed on the electronic device 100.

According to some example embodiments, the electronic device 100 may enter the acceleration mode according to a command of a user. The command of the user may be input to the electronic device 100 through one of many ways. According to an example embodiment, the input may include, but is not limited to, a touch input, a keyboard input, a voice input, a gesture input, etc., by a user interface, which may include, but is not limited to, a touch screen, a keyboard, a microphone, a gesture sensor, etc.

According to another example embodiment, a command for making the electronic device 100 enter the acceleration mode may also be received from a device external to the electronic device 100.

The AP 110 may inform the CP 120 that the electronic device 100 enters the acceleration mode, when the command for making the electronic device 100 enter the acceleration mode is received.

The CP 120 may detect a state of Radio Resource Control (RRC) of the electronic device 100, in response to the electronic device 100 entering the acceleration mode. According to an example embodiment, the state of the RRC of the electronic device 100 may be one of an RRC connection state and an RRC idle state, and the RRC connection state may include a discontinuous reception (DRX) state. According to an example embodiment, the discontinuous reception (DRX) may be referred to as a Connective Discontinuous Reception state, (C-DRX) state.

According to example embodiments, in response to the electronic device 100 being in the RRC connection state, the CP 120 may keep the electronic device 100 in the RRC connection state, regardless of whether the electronic device 100 sends and receives the service data.

For example, in response to the electronic device 100 being in the RRC connection state and not being in the DRX state, the CP 120 may keep the electronic device 100 in the RRC connection state and prohibit the electronic device 100 from entering the DRX state.

For example, in response to the electronic device 100 being in the DRX state, the CP 120 may keep the electronic device 100 in the DRX state.

According to example embodiments, in response to the electronic device 100 being in the RRC idle state, the CP 120 may make the electronic device 100 enter and keep in the RRC connection state, and prohibit the electronic device 1001 from entering the DRX state, regardless of whether the electronic device 100 sends and receives the service data.

According to example embodiments, the CP 120 may receive and/or send the service data of the application installed on the electronic device 100, while keeping the electronic device 100 in the RRC connection state.

According to an example embodiment, the CP 120 may reduce a series of signaling interactions required when the RRC idle state is changed to the RRC connection state by keeping the electronic device 100 in the RRC connection state, thereby reducing the delay in receiving and/or sending the service data of the application installed on the communication terminal.

According to an example embodiment, the CP 120 may further reduce the delay in receiving and/or sending the service data of the application installed on the electronic device 100 in the RRC connection state, by prohibiting the electronic device 100 from entering the DRX state.

According to an example embodiment, since keeping the electronic device 100 in the RRC connection state in the acceleration mode may increase power consumption of the electronic device 100, it may be necessary for the electronic device 100 to automatically exit the acceleration mode when the user forgets to exit the acceleration mode.

According to example embodiments, the power consumption of the electronic device 100 may be reduced by perform the following operations. For instance, when the electronic device 100 enters the acceleration mode, the AP 110 may perform timing operation, and when the AP 110 performs the timing operation for a specified period of time, the AP 110 informs the CP 120 that the electronic device 100 exits the acceleration mode. According to an example embodiment, the specified period of time may be a predetermined time.

In example embodiments, when the AP 110 performs the timing operation for the predetermined time, the AP 110 may also output a message indicating that the electronic device 100 exits the acceleration mode. For example, the AP 110 may visually output the message through a display module, or may non-visually output the message through voice, vibration, tactile sensation, or the like using a speaker module, a haptic module, or the like. For example, when the AP 110 performs the timing operation for the predetermined time, the AP 110 may also send the message indicating that the electronic device 100 exits the acceleration mode to the external device.

In example embodiments, when the electronic device 100 is in a network standard of a lower priority compared to a network standard of a higher priority, the delay in receiving and/or sending the service data of the application installed on the electronic device 100 is longer. For example, compared to a 5G (NR NSA, SA) network, when the electronic device 100 is in a 4G (LTE) network, the delay in receiving and/or sending the service data of the application installed on the electronic device 100 is longer.

According to example embodiments, in order to reduce the delay of receiving and/or sending the service data of the application installed on the electronic device 100, the CP 120 may change a network standard that the electronic device 100 operates or resides on, so that the electronic device 100 operates or resides on a network standard of a highest priority that the electronic device 100 is able to support actually. Hereinafter, a flowchart of the CP 120 changing the network standard that the electronic device 100 operates or resides on will be described in detail with reference to FIG. 3.

According to example embodiments, a priority of a network standard may be determined based on evolution technology of wireless communication. In general, with a development of the network standard, the highest transmission rate supported by the network standard is higher and higher. Therefore, the priority of the network standard may depend on the highest transmission rate supported by the network standard. The higher the highest transmission rate supported by the network standard, the higher the priority of the network standard. For example, among currently used network standards, a priority of the network standards is: NR SA>NR NSA>LTE>WCDMA>CDMA HRPD>GSM>CDMA 1×.

The communication method of a communication terminal according to example embodiments is described below in connection with FIG. 2.

Figure 2:
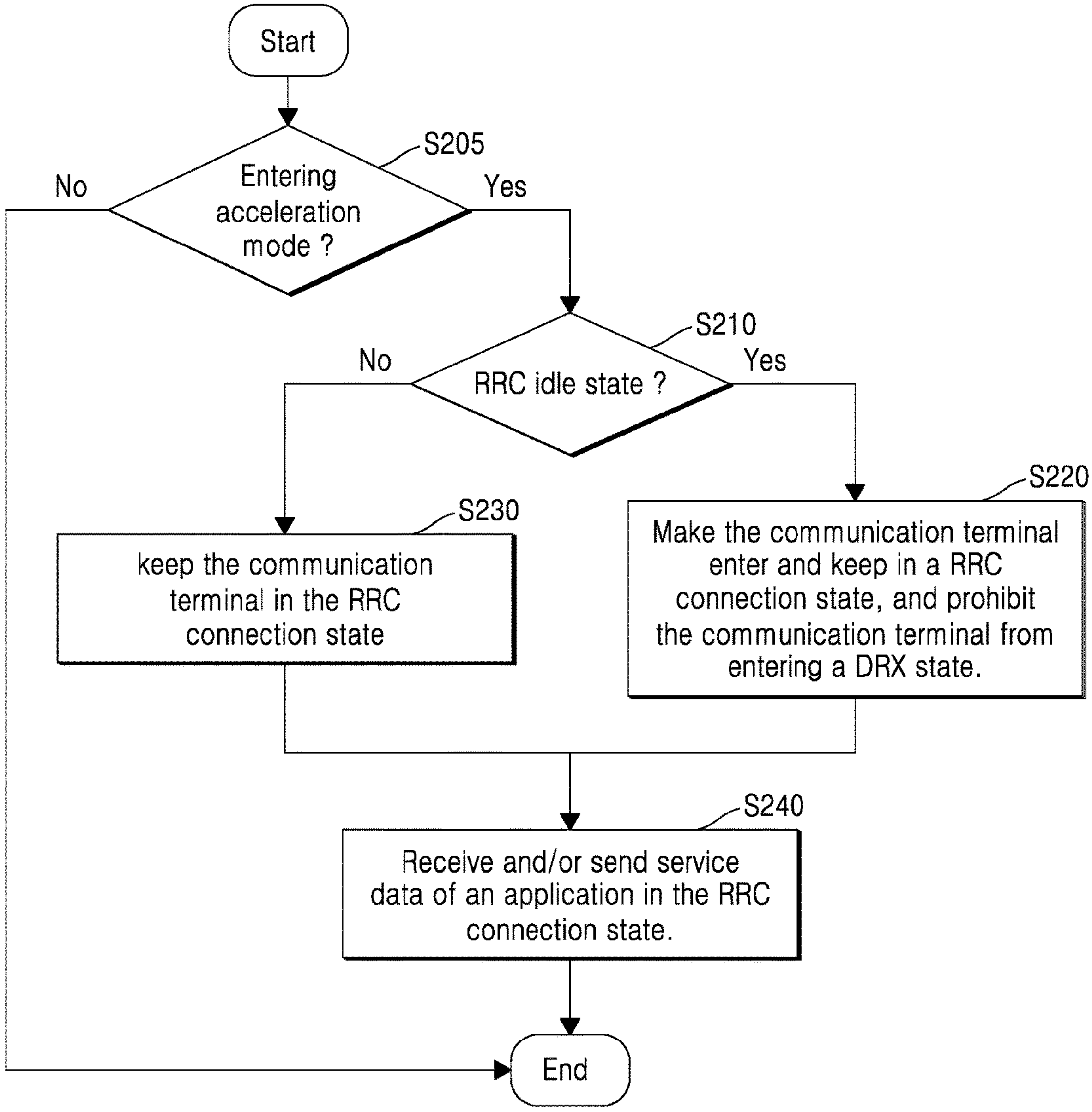
FIG. 2 is a flowchart showing a communication method of a communication terminal according to an example embodiment of the disclosure.

FIG. 2 is a flowchart showing a communication method of a communication terminal according to an example embodiment of the disclosure.

As shown in FIG. 2, in operation S210, in response to a communication terminal (e.g., the electronic device 100) entering an acceleration mode (S205), the CP 120 may detect a state of RRC of the communication terminal.

It may be appreciated to those skilled in the art that various known methods may be used to detect the state of RRC of the communication terminal, which are not limited in the states described in the disclosure with respect to FIGS. 1 and 2.

In operation S220, in response to the communication terminal being in a RRC idle state, the CP 120 may make the communication terminal enter and keep in a RRC connection state, and prohibit the communication terminal from entering a DRX state.

According to example embodiments, in response to the communication terminal being in the RRC idle state, the CP 120 may initiate a service request to establish an RRC connection without using an application processor of the communication terminal, so that the communication terminal enters the RRC connection state.

For example, the CP 120 may trigger a piling message to be sent to the CP 120 at an interface module between the CP 120 and the AP 110, so that the CP 120 initiates the service request to establish the RRC connection, and simulates that the AP establishes a packet switching (PS) service connection. Here, the piling message is a message simulating that AP 110 sends a message for sending the service request to the CP 120. In addition, an access reason of the RRC connection may be PS data indicating that there is data to be sent to the network, however, the example is not limited to thereto, and the access reasons of the RRC connection may also be other reasons (for example, registration, etc.).

According to example embodiments, in response to the communication terminal being in the RRC idle state, the CP 120 may send, to the AP 110, a message indicating that a network is to send data to the AP 110, thereby triggering the AP 110 to make the CP 120 establish a data connection, and make the communication terminal enter the RRC connection state.

For example, the CP 120 may send a message indicating that the network is to send data to the AP 110, to the AP 110, to inform the AP 110 that the network is to send data to the AP 110, by simulating a processing of the network sending data to the AP 110. Here, the network may not actually send data to the AP 110. After receiving the message, the AP 110 sends a signal for establishing a data connection to the CP 120, and the CP 120 establishes the RRC connection according to the signal for establishing the data connection.

According to example embodiments, during a access process of the RRC connection state, the CP 120 may prohibit the network from configuring the DRX state for the communication terminal to prohibit the communication terminal from entering the DRX state, by setting parameters representing connection state discontinuous reception capability reported by the communication terminal to be unsupported, or by making the parameters representing the connection state discontinuous reception capability not be included in parameters reported by the communication terminal.

According to example embodiments, when the communication terminal is in the RRC connection state and the network configures the DRX state for the communication terminal, the CP 120 may prohibit the communication terminal from entering the DRX state by refusing a configuration of the network and sending a response of the refusing to the network. It may be appreciated to those skilled in the art that various known methods (e.g., a 3GPP protocol) may be used to refuse the configuration of the network, which are not limited in the present application.

According to example embodiments, when the communication terminal is in the RRC connection state and the communication terminal does not send and receive the service data within predetermined time (e.g., the communication terminal does not send and receive the service data for the predetermined time), the CP 120 may periodically send an uplink scheduling request without using the AP 110 of the communication terminal, so that the RRC connection status is not released by the network and the communication terminal is kept in the RRC connection state.

In this case, when the network schedules the communication terminal by a physical downlink control channel (PDCCH) and allocates uplink resources of a physical uplink share channel (PUSCH), if there is no uplink service data needed to be sent in the communication terminal actually, the CP 120 may send a dummy data packet filled with all zeros to the network through the PUSCH.

According to example embodiments, when the communication terminal is in the RRC connection state, in response to the network configuring the communication terminal with a measurement control message for a traffic and the traffic to be sent uplink by the communication terminal being zero, the CP 120 may report a buffer status report being non-zero, so that the RRC connection status is not released by the network and the communication terminal is kept in the RRC connection state.

According to example embodiments, in response to the RRC connection state being released by the network, the CP 120 may make the communication terminal enter and keep in the RRC connection state again, and prohibiting the communication terminal from entering the DRX state.

In operation S230, in response to the communication terminal being in the RRC connection state, the CP 120 may keep the communication terminal in the RRC connection state.

The methods of keeping the communication terminal in the RRC connection state in operation S230 may be similar to the methods of keeping the communication terminal in the RRC connection state in operation S220.

In operation S240, the CP 120 may receive and/or send service data of an application installed on the communication terminal in the RRC connection state.

Although the method of making the communication terminal enter the RRC connection state, the method of keeping the communication terminal in the RRC connection state and the method of prohibiting the communication terminal from entering the DRX state according to the example embodiment of the disclosure are shown above, the disclosure is not limited thereto, and other method of making the communication terminal enter the RRC connection state, other method of keeping the communication terminal in the RRC connection state and other method of prohibiting the communication terminal from entering the DRX state in the related art may also be used.

Figure 3:
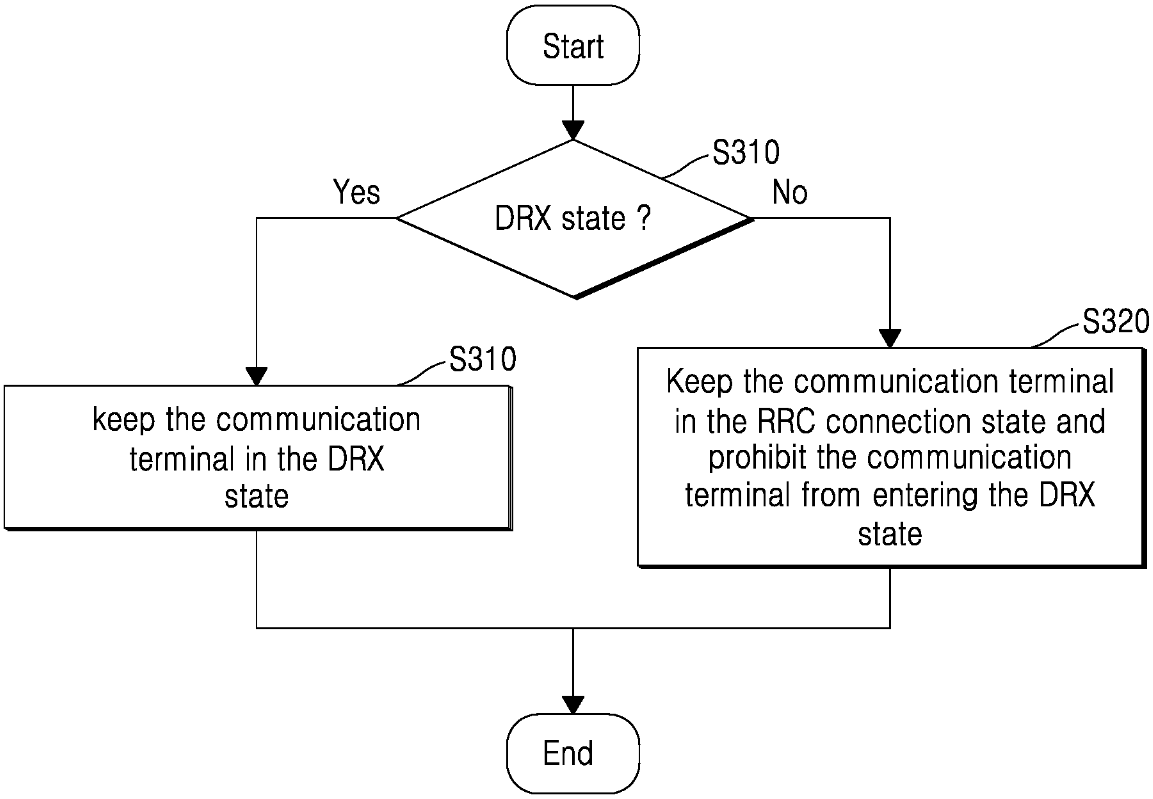
FIG. 3 is a flowchart showing a process of keeping the communication terminal in a RRC connection state in response to the communication terminal being in the RRC connection state in more detail according to an example embodiment of the disclosure.

FIG. 3 is a flowchart showing a process of keeping the communication terminal in a RRC connection state in response to the communication terminal being in the RRC connection state in more detail according to an example embodiment of the disclosure.

As shown in FIG. 3, in operation S310, the CP 120 may detect whether the communication terminal is in a DRX state of a RRC connection state.

In response to the communication terminal not being in the DRX state, in operation S320, the CP 120 may keep the communication terminal in the RRC connection state and prohibit the communication terminal from entering the DRX state.

According to example embodiments, when the communication terminal is in the RRC connection state and the network configures the DRX state for the communication terminal, the CP 120 may prohibit the communication terminal from entering the DRX state by refusing a configuration of the network and sending a response of the refusing to the network.

The methods of keeping the communication terminal in the RRC connection state in operation S310 may be similar to the methods of keeping the communication terminal in the RRC connection state in operation S220.

In response to the communication terminal being in the DRX state, in operation S330, the CP 120 may keep the communication terminal in the DRX state.

The methods of keeping the communication terminal in the RRC connection state in operation S330 may be similar to the methods of keeping the communication terminal in the RRC connection state in operation S220.

Figure 4:
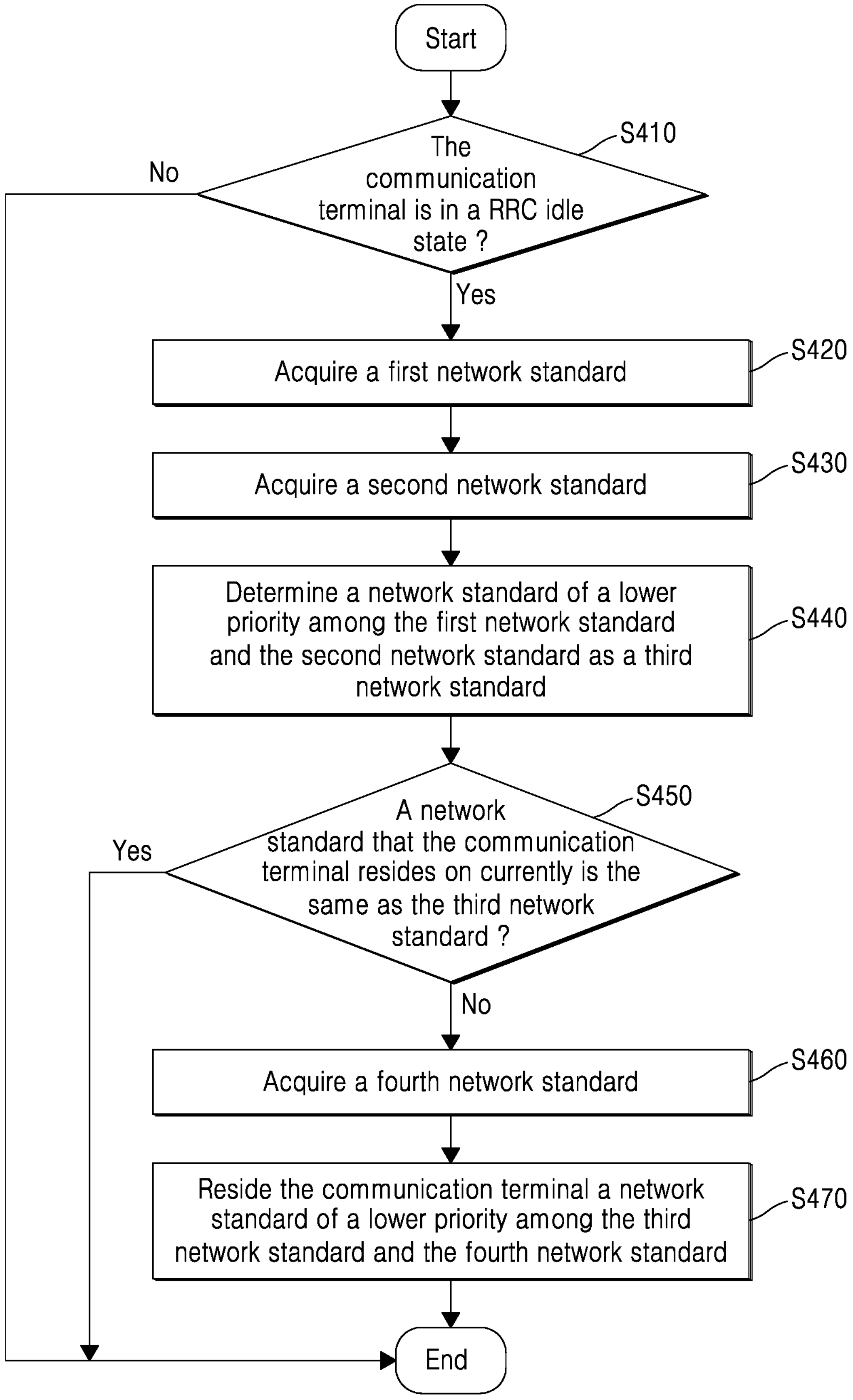
FIG. 4 shows a flowchart of residing the communication terminal on a network standard of a high priority according to an example embodiment of the disclosure.

FIG. 4 shows a flowchart of residing the communication terminal on a network standard of a high priority according to an example embodiment of the disclosure.

As shown in FIG. 4, in operation S410, the CP 120 may detect a state of RRC of the communication terminal.

In operation S420, in response to the communication terminal being in a RRC idle state, the CP 120 may acquire a first network standard of a highest priority that a subscriber identification module (SIM) card of the communication terminal is able to support.

In operation S430, the CP 120 may acquire a second network standard of a highest priority that the communication terminal is able to support.

It may be appreciated to those skilled in the art that various known methods may be used to acquire the first network standard of the highest priority that the SIM card of the communication terminal is able to support and the second network standard of the highest priority that the communication terminal is able to support, which are not limited in the present application.

In operation S440, the CP 120 may determine a network standard of a lower priority among the first network standard and the second network standard as a third network standard as a network standard of a highest priority that the communication terminal is able to support actually.

In operation S450, the CP 120 may determine whether a network standard that the communication terminal operates or resides on currently is the same as the third network standard. It may be appreciated to those skilled in the art that various known methods may be used to determine whether the network standard that the communication terminal operates or resides on currently is the same as the third network standard, which are not limited in the present application.

In operation S460, in response to the network standard that the communication terminal operates or resides on currently is different from the third network standard, the CP 120 may acquire a fourth network standard of a highest priority that is able to be supported under current wireless network environment.

According to example embodiments, the CP 120 may search the fourth network standard of the highest priority that is able to be supported under the current wireless network environment by a Background Public Land Mobile Network (BPLMN) process.

In operation S470, the CP 120 may determine a network standard of a lower priority among the third network standard and the fourth network standard as the network standard of the highest priority that the communication terminal is able to support actually, and reside the communication terminal on the network standard of the highest priority that the communication terminal is able to support actually.

Figure 5:
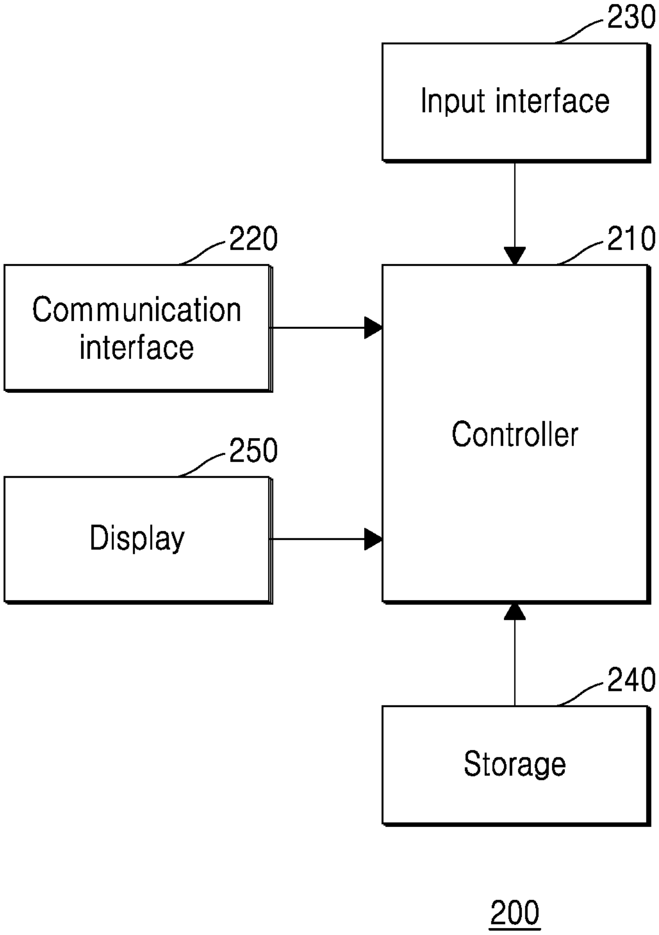
FIG. 5 shows a block diagram of an electronic device according to another example embodiment.

FIG. 5 shows a block diagram of an electronic device according to another example embodiment.

As shown in FIG. 5, an electronic device 200 in example embodiments includes a controller 210, a communication interface 220, an input interface 230, a storage 240, and a display 250.

The controller 210 processes inputs of users or commands of an external device. The controller 210 may display a processed result on the display 250 or send them to the communication interface 220. The controller 220 may be implemented as general-purpose processor, application processor (AP), application specific integrated circuit, field programmable gate array, etc., but the example embodiment is not limited thereto.

The communication interface 220 may perform communication operations of the electronic device (e.g., using the method shown in FIG. 2 or 3). The communication interface 220 may establish a communication channel to the communication network and/or may perform communication associated with service data of an application installed on the electronic device 200. The communication interface may be implemented by any one or any combination of a digital modem, a radio frequency (RF) modem, a WiFi chip, and related software and/or firmware.

The input interface 230 is configured to receive various input information and various control signals, and transmit the input information and control signals to the controller 210. The input interface 230 may be realized by various input devices such as keyboards and/or keypads, touch screens and/or styluses, etc; however, the example embodiment is not limited to thereto.

The storage interface 240 may include volatile memory and/or nonvolatile memory. The storage interface 240 may store various data generated and used by the electronic device. For example, the storage interface 240 may store an operating system (OS) and applications (e.g. applications associated with the method of the disclosure) for controlling operations of the electronic device.

The apparatuses, units, modules, devices, and other components described herein are implemented by hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIND) multiprocessing, multiple-instruction single-data (MISD) multiprocessing, and multiple-instruction multiple-data (MIMD) multiprocessing.

The methods that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control a processor or computer to implement the hardware components and perform the methods as described above are written as computer programs, code segments, instructions or any combination thereof, for individually or collectively instructing or configuring the processor or computer to operate as a machine or special-purpose computer to perform the operations performed by the hardware components and the methods as described above. In one example, the instructions or software include machine code that is directly executed by the processor or computer, such as machine code produced by a compiler. In another example, the instructions or software include higher-level code that is executed by the processor or computer using an interpreter. Programmers of ordinary skill in the art can readily write the instructions or software based on the block diagrams and the flow charts illustrated in the drawings and the corresponding descriptions in the specification, which disclose algorithms for performing the operations performed by the hardware components and the methods as described above.

The instructions or software to control a processor or computer to implement the hardware components and perform the methods as described above, and any associated data, data files, and data structures, are recorded, stored, or fixed in or on one or more non-transitory computer-readable storage media. Examples of a non-transitory computer-readable storage medium include read-only memory (ROM), random-access programmable read only memory (PROM), electrically erasable programmable read-only memory (EEPROM), random-access memory (RAM), dynamic random access memory (DRAM), static random access memory (SRAM), flash memory, non-volatile memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, blue-ray or optical disk storage, hard disk drive (HDD), solid state drive (SSD), flash memory, a card type memory such as multimedia card or a micro card (for example, secure digital (SD) or extreme digital (XD)), magnetic tapes, floppy disks, magneto-optical data storage devices, optical data storage devices, hard disks, solid-state disks, and any other device that is configured to store the instructions or software and any associated data, data files, and data structures in a non-transitory manner and providing the instructions or software and any associated data, data files, and data structures to a processor or computer so that the processor or computer can execute the instructions.

While this disclosure includes specific examples, it will be apparent to one of ordinary skill in the art that various changes in form and details may be made in these examples without departing from the spirit and scope of the claims and their equivalents.

What is claimed is:

1. A communication method of a communication terminal, comprising:

in response to the communication terminal entering a first mode, detecting a state of Radio Resource Control (RRC) of the communication terminal;

in response to the communication terminal being in a RRC idle state, controlling the communication terminal to enter and maintain an RRC connection state, and prohibiting the communication terminal from entering a discontinuous reception (DRX) state, the RRC connection state including the DRX state;

in response to the communication terminal being in the RRC connection state, controlling the communication terminal to maintain the RRC connection state; and receiving or sending service data of an application installed on the communication terminal in the RRC connection state.

2. The communication method of claim 1, wherein the controlling the communication terminal to maintain the RRC connection state in response to the communication terminal being in the RRC connection state comprises:

in response to the communication terminal being in the RRC connection state and not being in the DRX state, controlling the communication terminal to maintain the RRC connection state and prohibiting the communication terminal from entering the DRX state, and in response to the communication terminal being in the DRX state, controlling the communication terminal to maintain the DRX state.

3. The communication method of claim 1, further comprising:

in response to the communication terminal being in the RRC idle state, controlling the communication terminal to operate on a network standard of a highest priority actually supportable by the communication terminal, and controlling the communication terminal to enter and maintain the RRC connection state, and prohibiting the communication terminal from entering the DRX state.

4. The communication method of claim 3, wherein the controlling the communication terminal to operate on the network standard of the highest priority actually supportable by the communication terminal comprises:

acquiring a first network standard of a highest priority supportable by a subscriber identification module SIM card of the communication terminal;

acquiring a second network standard of a highest priority supportable by the communication terminal;

determining a network standard of a lower priority among the first network standard and the second network standard as a third network standard;

determining whether a network standard that the communication terminal is currently operating in is same as the third network standard, in response to the network standard that the communication terminal is currently operating in being different from the third network standard, acquiring a fourth network standard of a highest priority that is supportable under current wireless network environment, determining a network standard of a lower priority, among the third network standard and the fourth network standard, as the network standard of the highest priority actually supportable by the communication terminal, and operating the communication terminal on the network standard of the highest priority actually supportable by the communication terminal.

5. The communication method of claim 3, wherein a priority of the network standard is determined based on a highest transmission rate supported by the network standard, the higher the highest transmission rate supported by the network standard, the higher the priority of the network standard.

6. The communication method of claim 1, wherein the controlling the communication terminal to enter the RRC connection state comprises:

initiating a service request to establish an RRC connection without using an application processor of the communication terminal; or sending, a message indicating that a network is to send data to the application processor of the communication terminal, to the application processor, thereby triggering the application processor to make a communication processor establish a data connection, and make the communication terminal enter the RRC connection state.

7. The communication method of claim 1, wherein the prohibiting of the communication terminal from entering the DRX state comprises: during an access process of the RRC connection state, prohibiting a network from configuring the DRX state for the communication terminal, by setting parameters representing connection state discontinuous reception capability reported by the communication terminal to be unsupported, or by making the parameters representing the connection state discontinuous reception capability not be included in parameters reported by the communication terminal.

8. The communication method of claim 1, wherein the prohibiting of the communication terminal from entering the DRX state comprises: in response to a network configuring the DRX state for the communication terminal, refusing a configuration of the network and sending a response of the refusing to the network.

9. The communication method of claim 1, wherein the controlling the communication terminal to maintain the RRC connection state comprises one of:

when the communication terminal is in the RRC connection state and the communication terminal does not send and receive the service data within a reference time, periodically sending an uplink scheduling request without using an application processor of the communication terminal, and when a network schedules the communication terminal by a physical downlink control channel and allocates uplink resources of a physical uplink share channel, if there is no uplink service data needed to be sent in the communication terminal actually, sending a dummy data packet filled with all zeros to the network through the physical uplink share channel;

in response to the network configuring the communication terminal with a measurement control message for a traffic and the traffic to be sent uplink by the communication terminal being zero, reporting a buffer status report being non-zero, so that the RRC connection state is not released by the network; or in response to the RRC connection state being released by the network, controlling the communication terminal to enter and maintain in the RRC connection state again, and prohibiting the communication terminal from entering the DRX state.

10. A non-transitory computer-readable storage medium storing instructions that, when executed by a processor, cause the processor to execute the communication method of claim 1.

11. A communication terminal comprising:

a memory storing one or more instructions; and a processor configured to execute the one or more instruction to:

detect a state of Radio Resource Control (RRC) of the communication terminal, based on the communication terminal entering a first mode;

based on the communication terminal being in an RRC idle state, control the communication terminal to enter and maintain an RRC connection state, and prohibit the communication terminal from entering a discontinuous reception (DRX) state, the RRC connection state including the DRX state;

based on the communication terminal being in the RRC connection state, control the communication terminal to maintain the RRC connection state; and receive or send service data of an application installed on the communication terminal in the RRC connection state.

12. The communication terminal of claim 11, wherein the processor is further configured to execute the one or more instruction to:

in response to the communication terminal being in the RRC connection state and not being in the DRX state, control the communication terminal to maintain the RRC connection state and prohibiting the communication terminal from entering the DRX state, and in response to the communication terminal being in the DRX state, control the communication terminal to maintain the DRX state.

13. The communication terminal of claim 11, wherein the processor is further configured to execute the one or more instruction to:

in response to the communication terminal being in the RRC idle state, control the communication terminal to operate on a network standard of a highest priority actually supportable by the communication terminal, and control the communication terminal to enter and maintain the RRC connection state, and prohibit the communication terminal from entering the DRX state.

14. The communication terminal of claim 13, wherein the processor is further configured to execute the one or more instruction to:

acquire a first network standard of a highest priority supportable by a subscriber identification module SIM card of the communication terminal;

acquire a second network standard of a highest priority supportable by the communication terminal;

determine a network standard of a lower priority among the first network standard and the second network standard as a third network standard;

determine whether a network standard that the communication terminal is currently operating in is same as the third network standard;

based on the network standard that the communication terminal is currently operating in being different from the third network standard;

acquire a fourth network standard of a highest priority that is supportable under current wireless network environment; and determine a network standard of a lower priority, among the third network standard and the fourth network standard, as the network standard of the highest priority actually supportable by the communication terminal, and operate the communication terminal on the network standard of the highest priority actually supportable by the communication terminal.

15. The communication terminal of claim 11, wherein the controlling the communication terminal to maintain the RRC connection state comprises one of:

when the communication terminal is in the RRC connection state and the communication terminal does not send and receive the service data within a reference time, periodically sending an uplink scheduling request without using an application processor of the communication terminal, and when a network schedules the communication terminal by a physical downlink control channel and allocates uplink resources of a physical uplink share channel, if there is no uplink service data needed to be sent in the communication terminal actually, sending a dummy data packet filled with all zeros to the network through the physical uplink share channel;

in response to the network configuring the communication terminal with a measurement control message for a traffic and the traffic to be sent uplink by the communication terminal being zero, reporting a buffer status report being non-zero, so that the RRC connection state is not released by the network; or in response to the RRC connection state being released by the network, controlling the communication terminal to enter and maintain in the RRC connection state again, and prohibiting the communication terminal from entering the DRX state.

16. The communication method of claim 1, wherein the first mode is an acceleration mode configured to reduce delay in receiving and sending of the service data of the application installed on the communication terminal.

17. The communication method of claim 16, wherein the acceleration mode is selected by a user of the communication terminal.

18. The communication terminal of claim 11, wherein the first mode is an acceleration mode configured to reduce delay in receiving and sending of the service data of the application installed on the communication terminal.

19. The communication terminal of claim 18, wherein the acceleration mode is selected by a user of the communication terminal.

* * * * *